(12) United States Patent
Echigo et al.

(10) Patent No.: US 11,189,838 B2
(45) Date of Patent: Nov. 30, 2021

(54) METAL-SUPPORTED ELECTROCHEMICAL ELEMENT, SOLID OXIDE FUEL CELL AND METHOD OF MANUFACTURING SUCH METAL-SUPPORTED ELECTROCHEMICAL ELEMENT

(71) Applicant: Osaka Gas Co., Ltd., Osaka (JP)

(72) Inventors: Mitsuaki Echigo, Osaka (JP); Hisao Ohnishi, Osaka (JP); Kyohei Manabe, Osaka (JP); Osamu Yamazaki, Osaka (JP); Kazuyuki Minami, Osaka (JP); Yuji Tsuda, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 0 days.

(21) Appl. No.: 16/910,161

(22) Filed: Jun. 24, 2020

(65) Prior Publication Data

US 2020/0328429 A1    Oct. 15, 2020

Related U.S. Application Data

(63) Continuation of application No. 15/760,786, filed as application No. PCT/JP2016/077146 on Sep. 14, 2016, now Pat. No. 10,892,493.

(30) Foreign Application Priority Data

Sep. 18, 2015 (JP) .................................. 2015-186049

(51) Int. Cl.
*H01M 4/86* (2006.01)
*H01M 8/0232* (2016.01)
(Continued)

(52) U.S. Cl.
CPC ....... *H01M 4/8605* (2013.01); *H01M 4/8657* (2013.01); *H01M 4/88* (2013.01);
(Continued)

(58) Field of Classification Search
None
See application file for complete search history.

(56) References Cited

U.S. PATENT DOCUMENTS 5,114,803 A    5/1992  Ishihara et al.
9,048,498 B2   6/2015  Muecke et al.
(Continued)

FOREIGN PATENT DOCUMENTS

GN    101183716 A    5/2008
JP    H467564 A      3/1992
(Continued)

OTHER PUBLICATIONS

Guilan et al., Preparation of functionally gradient PEN of SOFC by plasma spray digital forming, J. Huazhong University of Science & Technology (Nature Science Edition), Sep. 2007.

*Primary Examiner* — Sarah A. Slifka
(74) *Attorney, Agent, or Firm* — The Webb Law Firm

(57) ABSTRACT

Realized is an element having an electrolyte layer that is dense and has high gas barrier characteristics. A metal-supported electrochemical element includes at least a metal substrate as a support, an electrode layer formed on/over the metal substrate, a buffer layer formed on the electrode layer, (Continued)

and an electrolyte layer formed on the buffer layer. The electrode layer is porous and the electrolyte layer is dense. The buffer layer has density higher than density of the electrode layer and lower than density of the electrolyte layer.

17 Claims, 3 Drawing Sheets

(51) Int. Cl.

| | | |
|---|---|---|
| *H01M 8/1213* | (2016.01) | |
| *H01M 8/1253* | (2016.01) | |
| *H01M 8/126* | (2016.01) | |
| *H01M 4/88* | (2006.01) | |
| *H01M 8/12* | (2016.01) | |
| *H01M 8/02* | (2016.01) | |
| *H01M 8/124* | (2016.01) | |
| *H01M 4/90* | (2006.01) | |

(52) U.S. Cl.
CPC ........... *H01M 4/8885* (2013.01); *H01M 8/02* (2013.01); *H01M 8/0232* (2013.01); *H01M 8/12* (2013.01); *H01M 8/126* (2013.01); *H01M 8/1213* (2013.01); *H01M 8/1253* (2013.01); *H01M 4/9025* (2013.01); *H01M 2008/1293* (2013.01); *Y02E 60/50* (2013.01); *Y02P 70/50* (2015.11)

(56) References Cited

U.S. PATENT DOCUMENTS

| | | |
|---|---|---|
| 2004/0058228 A1 | 3/2004 | Shibata et al. |
| 2007/0134543 A1 | 6/2007 | Huang et al. |
| 2012/0021332 A1 | 1/2012 | Hwang et al. |
| 2013/0108943 A1 | 5/2013 | Yamanis et al. |
| 2014/0051006 A1 | 2/2014 | Hwang et al. |
| 2015/0064596 A1 | 3/2015 | Leah et al. |

FOREIGN PATENT DOCUMENTS

| | | |
|---|---|---|
| JP | 2004119108 A | 4/2004 |
| JP | 2007165143 A | 6/2007 |
| JP | 20084422 A | 1/2008 |
| JP | 2008234927 A | 10/2008 |
| JP | 2008243723 A | 10/2008 |
| JP | 201114461 A | 1/2011 |
| JP | 2011249186 A | 12/2011 |
| JP | 201377409 A | 4/2013 |
| JP | 2013511795 A | 4/2013 |
| TW | 201409815 A | 3/2014 |
| WO | 2014191173 A1 | 12/2014 |
| WO | 2015033103 A1 | 3/2015 |

METAL-SUPPORTED ELECTROCHEMICAL ELEMENT, SOLID OXIDE FUEL CELL AND METHOD OF MANUFACTURING SUCH METAL-SUPPORTED ELECTROCHEMICAL ELEMENT

CROSS REFERENCE TO RELATED APPLICATIONS

This application is a continuation of U.S. application Ser. No. 15/760,786 filed on Mar. 16, 2018, which is the United States national phase of International Application No. PCT/JP2016/077146 filed Sep. 14, 2016, and claims priority to Japanese Patent Application No. 2015-186049 filed Sep. 18, 2015, the disclosures of which are hereby incorporated in their entirety by reference.

TECHNICAL FIELD

This invention relates to a metal-supported electrochemical element including at least a metal substrate as a support, an electrode layer formed on/over the metal substrate, a buffer layer formed on the electrode layer, and an electrolyte layer formed on the buffer layer. The invention relates also to a solid oxide fuel cell as well as a method of manufacturing such metal-supported electrochemical element.

BACKGROUND ART

In the case of the conventional electrolyte-supported solid oxide fuel cell (to be referred to as "SOFC" for short, hereinafter) and an electrode-supported SOFC, in order to obtain an electrolyte layer which is dense and has high gas tightness and gas barrier characteristics, a reduction firing is effected at a high temperature (e.g. 1400° C.). In recent years, for improvement of robustness, there has been developed a metal-supported SOFC configured such that a fuel electrode, an air electrode and an electrolyte layer are caused to be supported on a metal substrate.

Patent Document 1 discloses a metal-supported SOFC having a fuel electrode layer, an electrolyte layer and an air electrode layer in the form of thin films laminated in this order on a porous metal substrate. In a manufacturing process of this SOFC, after a material of the electrolyte layer is applied on the fuel electrode layer and dried, a pressing work is effected. Thereafter, the sintering is effected, whereby a dense electrolyte layer is formed.

BACKGROUND ART DOCUMENT

Patent Document

Patent Document 1: Japanese Unexamined Patent Application Publication No. 2008-234927

SUMMARY

Problem to be Solved by Invention

However, even with the electrolyte layer obtained by the method of Patent Document 1, the performance is still insufficient to obtain a satisfactory open circuit voltage (OCV), thus requiring improvement. On the other hand, if a high-temperature heat treatment is effected at the time of manufacturing of the metal-supported SOFC, this can result in deterioration of the metal substrate as a support and diffusion of elements such as Cr from the metal substrate, which in turn would provide adverse effect on the constituent components (electrode layer, electrolyte layer) of the SOFC and eventually deterioration of the performance and durability of the SOFC. Therefore, a heat process at a lower temperature is desirable. However, if the heat treatment temperature at the time of manufacturing is reduced, this will make it difficult to obtain an electrode layer and an electrolyte layer with high quality. For instance, reduction in the firing temperature of the electrolyte layer results in difficulty in obtaining an electrolyte layer having high density and high gas tightness and gas barrier characteristics.

Moreover, in the case of the conventional electrode-supported SOFC or electrolyte-supported SOFC, etc., these were obtained by co-sintering an anode layer of cermet and an electrolyte layer of ceramics. In this case, the respective layers together with the support are contracted simultaneously, so the interfacial stress applied by the support to the respective layers on this support was not significant. However, in the case of the metal-supported SOFC using a metal substrate as the support, contraction rates at the time of firing are different between the metal substrate and the electrolyte layer or the electrode layer. So, when the electrolyte layer and the electrode layer are formed on the metal substrate, the electrolyte layer and the electrode layer receive significant interfacial stress from the metal substrate. Accordingly, it was very difficult to form, on the metal substrate, a porous electrode layer and a high density, gas tightness and high gas barrier characteristics electrolyte layer that have high resistance against various stresses such as heat shock and superior performance, reliability and stability.

Namely, it was very difficult to obtain such metal-supported SOFC having, on/over its metal substrate, a porous electrode layer and a high density, gas tightness and high gas barrier characteristics electrolyte layer that have superior performance, reliability and stability, in e.g. a temperature range equal to or lower than 1100° C. at which range damage to the metal substrate can be effectively suppressed. Especially, it was very difficult to use a zirconia-based material such as YSZ requiring a high temperature range for sintering, as an electrolyte.

The present invention has been made in view of the above-described problem and its object resides in realizing a metal-supported electrochemical element having, on/over its metal substrate, a porous electrode layer and a high density, gas tightness and high gas barrier characteristics electrolyte layer that have superior performance, reliability and stability.

Solution

For accomplishing the above-noted object, according to a characterizing feature of a metal-supported electrochemical element relating to the present invention, the metal-supported electrochemical element includes at least a metal substrate as a support, an electrode layer formed on/over the metal substrate, a buffer layer formed on the electrode layer, and an electrolyte layer formed on the buffer layer; wherein the electrode layer is porous and the electrolyte layer is dense, and the buffer layer has density higher than density of the electrode layer and lower than density of the electrolyte layer.

Through extensive and intensive research, the present inventors discovered that by providing a buffer layer between a porous electrode layer and an electrolyte layer that is dense, the porous electrode layer and the electrolyte layer can be formed in a stable manner on/over the metal substrate. Moreover, the provision of such buffer layer between the electrode layer and the electrolyte layer allows alleviation of various kinds of stress such as heat shock, so that an element having superior reliability and stability can be formed. More particularly, according to the above-described characterizing feature, by rendering the density of the buffer layer higher than density of the electrode layer and also lower than the density of the electrolyte layer, a high density and gas tightness and high gas barrier characteristics electrolyte layer can be formed in a stable manner. Moreover, the above-described arrangement further allows stable formation on/over the metal substrate a porous electrode layer with no impairment in its gas diffusion property requisite for the electrode layer and the electrolyte layer having ion conductivity and gas barrier properties requisite for the electrolyte layer. Here, the term "density" is understood to mean a ratio of material occupying a layer in a space and can be represented as (1-vacancy). Further, this is equivalent to a relative density.

According to a further characterizing feature of the metal-supported electrochemical element relating to the present invention, the buffer layer contains a ceria-based material.

With the above characterizing feature, since the buffer layer contains a ceria-based material, the buffer layer is provided with mixed conductivity. With this, an element having high electrochemical performance can be realized.

According to a further characterizing feature of the metal-supported electrochemical element relating to the present invention, the electrolyte layer contains stabilized zirconia.

With the above characterizing feature, since the electrolyte layer contains stabilized zirconia, there can be realized an element capable of achieving high electrochemical performance even in a relatively high temperature range of 600° C. or higher, preferably range of 650° C. or higher.

According to a further characterizing feature of the metal-supported electrochemical element relating to the present invention, the buffer layer has a thickness of 4 µm or more.

With the above characterizing feature, a buffer layer having high mechanical strength can be obtained in a stable manner, even with an inexpensive technique such as the screen printing.

According to a further characterizing feature of the metal-supported electrochemical element relating to the present invention, the buffer layer has a thickness of 10 µm or less.

With the above characterizing feature, it is possible to obtain an element having high electrochemical performance with effective suppression of increase of internal resistance.

According to a further characterizing feature of the metal-supported electrochemical element relating to the present invention, the density of the buffer layer is 50% or more and less than 98%.

If the buffer layer has a density of 50% or more and less than 98%, the layer can be obtained in a stable manner, even with an inexpensive technique such as screen printing. In addition, there can be realized an element having high mechanical strength that is capable of effectively alleviating various stresses such as heat shock and that also is capable of achieving high electrochemical performance. If the density of the buffer is too high, due to a large difference of density between the electrode layer and the buffer layer, it becomes difficult to obtain the effect of alleviating stress between the electrode layer and the buffer layer. On the other hand, if the density is too low, due to a resultant significant density difference between the buffer layer and the electrolyte layer, it becomes difficult to obtain the effect of alleviating the stress between the buffer layer and the electrolyte layer. Preferably, the density of the buffer layer is 80% or higher, since the effect of alleviating stress between the buffer layer and the electrolyte layer becomes greater. Still preferably, the density of the buffer layer is less than 96%, since the effect of alleviating stress between the buffer layer and the electrolyte layer becomes even greater.

According to a further characterizing feature of the metal-supported electrochemical element relating to the present invention, a part of the electrolyte layer contains a dense electrolyte layer having density of 98% or higher.

With the above-described characterizing feature, because a part of the electrolyte layer contains a dense electrolyte layer, even when certain defect is present inside the electrolyte layer, the electrolyte layer as a whole can still maintain high gas tightness and gas barrier characteristics. And, such electrolyte layer can be formed by an inexpensive technique even in a temperature range (e.g. 1100° C. or lower) capable of suppressing damage to the metal substrate; and the electrolyte layer capable of achieving high electrochemical performance can be formed easily. Namely, such electrolyte layer can be suitably used in a metal-supported electrochemical element.

According to a further characterizing feature of the metal-supported electrochemical element relating to the present invention, the element further includes a diffusion suppressing layer for suppressing diffusion of Cr from the metal substrate to the electrode layer.

With the above-described characterizing feature, performance deterioration of the element attributable to Cr diffusion to the electrode layer can be suppressed.

According to a further characterizing feature of the metal-supported electrochemical element relating to the present invention, the diffusion suppressing layer comprises a metal oxide layer formed on a surface of the metal substrate.

With the above-described characterizing feature, the process of forming the diffusion suppressing layer can be simple, so that the element can be manufactured at low cost.

According to a further characterizing feature of the metal-supported electrochemical element relating to the present invention, the metal substrate has a plurality of through holes.

With the above-described characterizing feature, gas can be fed to the electrode layer through the plurality of through holes, so that the performance of the element can be further improved with a simple arrangement.

According to a further characterizing feature of the metal-supported electrochemical element relating to the present invention, the through holes are formed inside a region in the metal substrate where the electrolyte layer is formed.

With the above-described characterizing feature, the region where the through holes are formed will be covered by the electrolyte layer having high density and gas tightness and high gas barrier characteristics. Thus, this will eliminate need for a separate arrangement for preventing leak of gas to other parts, such as a packing, a sealing, etc. Namely, increase of manufacturing cost of the element can be suppressed.

According to a further characterizing feature of the metal-supported electrochemical element relating to the present invention, the through holes are formed inside a region in the metal substrate where the electrode layer is formed.

With the above-described characterizing feature, gas fed through the through holes can be fed to the electrode layer in an efficient manner, thus being suitable as an arrangement of an electrochemical element.

According to a further characterizing feature of the metal-supported electrochemical element relating to the present invention, on/over the electrolyte layer, there is provided a counter electrode layer as a counter electrode to the electrode layer.

With the above-described characterizing feature, as described above, there can be realized an electrochemical element including, on a metal substrate, the porous electrode layer, the buffer layer having density higher than the electrode layer and lower than the electrolyte layer, the high density, gas tightness and gas barrier characteristics electrolyte layer, and the counter electrode layer and usable as an electrochemical element with the electrode layer and the counter electrode layer. Namely, there can be realized a metal-supported electrochemical element having high performance and superior stability/reliability and capable of implementing an anode reaction and a cathode reaction together.

According to a further characterizing feature of the metal-supported electrochemical element relating to the present invention, the element further includes a reaction preventing layer formed between the electrolyte layer and the counter electrode layer.

With the above-described characterizing feature, it is possible to realize an element having superior long-terminal durability, through effective prevention of reaction between components of the electrolyte layer and components of the counter electrode layer.

For accomplishing the above-noted object, according to a characterizing feature of a solid oxide fuel cell relating to the present invention, the fuel cell comprises the above-described metal-supported electrochemical element and the fuel cell can be operated at time of its rated operation in a temperature range from 600° C. or higher to 750° C. or lower.

With the above-described characterizing feature, since the fuel cell is operated at time of its rated operation in a temperature range from 600° C. or higher to 750° C. or lower, the original performance of the fuel cell can be maintained for a long period, with effective suppression of deterioration of the metal-supported electrochemical element while continuously achieving high electric power generation performance at the same time. Incidentally, more preferably, the fuel cell is configured to be operable at time of its rated operation in a temperature range from 650° C. or higher to 750° C. or lower, since this can further improve the power generation performance of the fuel cell.

For accomplishing the above-noted object, according to a characterizing feature of a method of manufacturing a metal-supported electrochemical element relating to the present invention, the method comprises:

an electrode layer forming step for forming a porous electrode layer on/over a metal substrate as a support;

a buffer layer forming step for forming a buffer layer on the electrode layer; and an electrolyte layer forming step for forming a dense electrolyte layer on the buffer layer;

wherein the buffer layer has density higher than density of the electrode layer and lower than density of the electrolyte layer; and the electrode layer forming step, the buffer layer forming step, and the electrolyte layer forming step are effected at 1100° C. or lower.

With the above-described characterizing feature, on/over a metal substrate, a porous electrode layer, a buffer layer formed on the electrode layer, and an electrolyte layer formed on the buffer layer are provided and by setting the density of the buffer layer higher than density of the electrode layer and lower than density of the electrolyte layer, a porous electrode layer and a dense, gas tight and high gas barrier electrolyte layer can be formed on the metal support in a stable manner. Further, since the electrode layer forming step, the buffer layer forming step, and the electrolyte layer forming step are effected at 1100° C. or lower, a quality element can be obtained with effective suppression of deterioration of the metal substrate. Further, when needed, in case a counter electrode forming step for forming a counter electrode layer and a reaction preventing layer forming step for forming a reaction preventing layer are included in the manufacturing process of the metal-supported electrochemical element, it is preferred that these additional steps be effected also at 1100° C. or lower. With this, a quality element can be obtained with effective suppression of deterioration of the metal substrate.

EMBODIMENTS

First Embodiment

Next, with reference to FIG. 1 and FIG. 2, there will be explained a metal-supported electrochemical element E, a solid oxide fuel cell (SOFC), and a method of manufacturing the metal-supported electrochemical element E. The metal-supported electrochemical element E is used as e.g. a constituent of a solid oxide fuel cell configured to generate electric power with supply of fuel gas containing hydrogen and air. Incidentally, in the following, when a positional relationship of layers is to be designated, the side of an electrolyte layer 4 as seen from a buffer layer 3 may be referred to as "upper" or "upper side", and the side of an electrode layer 2 may be referred to as "lower" or "lower side". Further, the face of the side of a metal substrate 1 where the electrode layer 2 is formed may be referred to as "front side" and the opposite side may be referred to as "back side".

Metal-Supported Electrochemical Element

Figure 1:
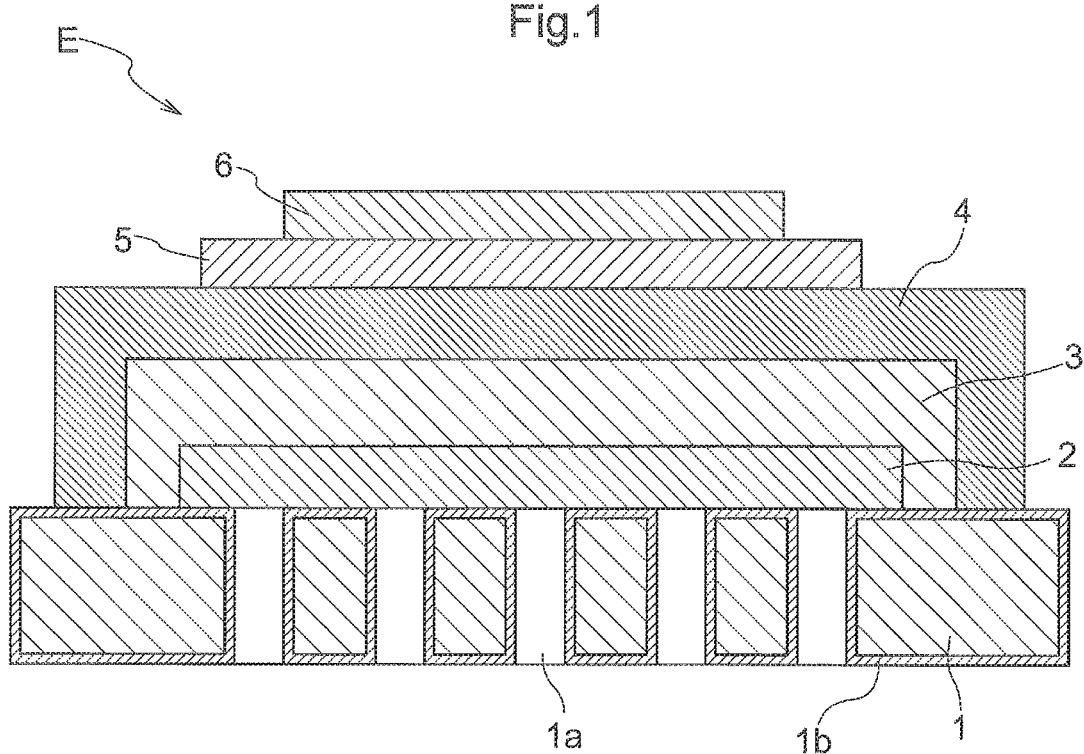
FIG. 1 is a schematic showing a configuration of a metal-supported electrochemical element.

The metal-supported electrochemical element E, as shown in FIG. 1, includes at least a metal substrate 1 as a support, an electrode layer 2 formed on/over the metal substrate 1, a buffer layer 3 formed on the electrode layer 2, and an electrolyte layer 4 formed on the buffer layer 3. And, the metal-supported electrochemical element E further includes a reaction preventing layer 5 formed on the electrolyte layer 4, and a counter electrode layer 6 formed on the reaction preventing layer 5. The counter electrode layer 6 is formed on/over the electrolyte layer 4 and the reaction preventing layer 5 is formed between the electrolyte layer 4 and the counter electrode layer 6. The electrode layer 2 is porous and the electrolyte layer 4 is dense. And, the density of the buffer layer 3 is higher than the density of the electrode layer 2 and lower than the density of the electrolyte layer 4. Here, the term "density" is understood to mean a ratio of material constituting a layer occupying in a space and can be represented as (1-vacancy). Further, this is equivalent to a relative density.

Metal Substrate

The metal substrate 1 serves as a support that supports the electrode layer 2, the buffer layer 3 and the electrolyte layer 4, etc. thus maintaining the strength of the metal-supported electrochemical element E. As a material of the metal substrate 1, a material having good electron conductivity, heat resistance and acid resistance and corrosion resistance is employed. For instance, ferritic stainless steel, austenitic stainless steel, nickel alloy, etc. will be used. In particular, an alloy containing chrome can be suitably employed.

The metal substrate 1 includes a plurality of through holes 1a formed through the front face and the back face thereof. Incidentally, the through holes 1a can be formed in the metal substrate 1 by e.g. laser beam machining or the like. The through holes 1a have a function of allowing permeation of gas through from the back face to the front face of the metal substrate 1. For providing the metal substrate with such gas permeability, a porous metal can be used also.

On the surface of the metal substrate 1, a metal oxide layer 1b as a "diffusion suppressing layer" is provided. Namely, between the metal substrate 1 and the electrode layer 2 to be described later, such diffusion suppressing layer is formed. The metal oxide layer 1b is formed not only on the face of the metal substrate 1 exposed to the outside, but also on its face containing the electrode layer 2 (interface) as well as the inner faces of the through holes 1a. With the presence of such metal oxide layer 1b, mutual element diffusion between the metal substrate 1 and the electrode layer 2 can be suppressed. For instance, if a ferritic stainless steel is employed as the metal substrate 1, the metal oxide layer 1b will be formed mainly of a chromium oxide. And, diffusion of e.g. chromium atoms or the like of the metal substrate 1 to the electrode layer 2 and/or the electrolyte layer 4 is suppressed by the metal oxide layer 1b containing the chromium oxide as its principal component. Preferably, the thickness of the metal oxide layer 1b lies in the sub-micron order. Further, for instance, preferably, its average thickness ranges from 0.3 μm or more to 0.7 μm or less. Further, preferably, its minimal thickness is about 0.1 μm or more; and its maximal thickness is about 1.1 μm or less.

In case a ferritic stainless steel is employed as the metal substrate 1, its heat expansion coefficient is close to those of YSZ (yttria stabilized zirconia), GDC (gadolinium-doped ceria, referred to as CGO also), etc. Therefore, even with repetition of cold-temperature and high-temperature cycles, the metal-supported electrochemical element E will not be damaged easily. Therefore, a metal-supported electrochemical element E having superior long-term durability can be realized advantageously.

Electrode Layer

The electrode layer 2, as shown in FIG. 1, is provided in the form of a thin film in the face on the front side of the metal substrate 1 and at a region thereof great than its region where the through holes 1a are provided. Thus, the whole region having the through holes 1a is covered by the electrode layer 2. Namely, the through holes 1a are formed inside the region of the metal substrate 1 where the electrode layer 2 is formed. In other words, all of the through holes 1a are provided to face the electrode layer 2.

As a material forming the electrode layer 2, a cermet material such as NiO-GDC, Ni-GDC, NiO—YSZ, Ni—YSZ, CuO—CeO$_2$, Cu—CeO$_2$, etc. can be used for example. In these examples, GDC, YSZ, CeO$_2$ can be called "aggregate" of the cermet material. Incidentally, the electrode layer 2 is formed, preferably, by such a technique as a low-temperature firing technique (e.g. a wet-type method using a firing process in a low-temperature range, without firing in a high-temperature range higher than 1100° C., for instance), aerosol deposition technique, thermal spraying technique, etc. With use of a process usable in such low-temperature range and without using firing in a high-temperature range higher than 1100° C., a favorable electrode layer 2 can be obtained. Therefore, the metal substrate 1 will not be damaged and mutual element diffusion between the metal substrate 1 and the electrode layer 2 can be suppressed, whereby an electrochemical element having superior durability can be realized advantageously. Moreover, using a low-temperature firing technique will be further preferred since it will facilitate raw material handling.

The electrode layer 2 is provided with a plurality of pores in its interior and surface, in order to obtain gas permeability. Namely, the electrode layer 2 is formed as a porous layer. The electrode layer 2 is formed to obtain a density ranging from 30% or more to less than 80%. The pore size can be chosen to be suitable for allowing smooth progress of reaction when the electrochemical reaction is to take place.

Buffer Layer

The buffer layer 3, as shown in FIG. 1, is provided in the form of a thin film on the electrode layer 2 to cover this electrode layer 2. As a material forming this buffer layer 3, for instance, YSZ (yttria stabilized zirconia), SSZ (scandium stabilized zirconia), or GDC (gadolinium-doped ceria), YDC (yttrium-doped ceria), SDC (samarium-doped ceria), etc. can be used. In particular, a ceria-based ceramics can be used advantageously.

Preferably, the buffer layer 3 is formed by a low-temperature firing technique (e.g. a wet-type method using a firing process in a low-temperature range, without firing in a high-temperature range higher than 1100° C., for instance), aerosol deposition technique, thermal spraying technique, etc. With use of a film forming process usable in such low-temperature range, the buffer layer 3 can be used without using firing in a high-temperature range higher than 1100° C. Therefore, the metal substrate 1 will not be damaged and mutual element diffusion between the metal substrate 1 and the electrode layer 2 can be suppressed, whereby an electrochemical element E having superior durability can be realized advantageously. Moreover, using a low-temperature firing technique will be further preferred since it will facilitate raw material handling.

The buffering layer 3 has arrangements/features as follows.

Firstly, the buffer layer 3 is formed so that its density may be higher than the electrode layer 2 and lower than the electrolyte layer 4. For instance, the respective layers will be formed such that the density of the electrode layer 2 is 30% or more and less than 80%, the density of the buffer layer 3 is 50% or more and less than 98%, and the density of the electrolyte layer 4 is 96% or more, respectively, thus the density of the buffer layer 3 being higher than the density of the electrode layer 2 and lower than the density of the electrolyte layer 4. The respective densities of the buffer layer 3, the electrolyte layer 4 and the electrode layer 2 will be determined according to materials used respectively therein and/or various conditions employed at the time of respective formations thereof. etc. For instance, according to the particle sizes, shapes, compositions of powder materials, various forming conditions such as temperatures of firing, the densities of the buffer layer 3, the electrolyte layer 4 and the electrode layer 2 formed will vary. Namely, with appropriate setting of these conditions, the densities of the buffer layer 3, the electrolyte layer 4 and the electrode layer 2 can be adjusted.

Also, the buffer layer 3 is formed to obtain a thickness within a predetermined range, through appropriate setting of mode of its material, conditions at the time of its forming, etc. Specifically, it is preferred that the buffer layer 3 be formed to obtain a thickness of 4 µm or more, and 10 µm or less.

In order to form the dense electrolyte layer 4 upwardly of the porous electrode layer 2, the buffer layer 3 is disposed therebetween as a layer that continuously joins these and that has a buffering function for buffering various stresses applied at the time of manufacture of the element or operation of the element. To this end, the buffer layer 3 is formed in order to obtain positively density lower than the electrolyte layer 4. Further, the buffer layer 3 is formed in order to obtain positively density higher than the electrode layer 2. With these arrangements, even when the porous electrode layer 2 and the dense electrolyte layer 4 are formed on the metal substrate, the buffer layer 3 can effectively absorb/alleviate various kinds of stress between the respective layers, thus providing a further effect of enhancing the performance, reliability and stability of the metal-supported electrochemical element E.

Further, preferably, the buffer layer 3 has oxygen ion (oxide ion) conductivity. More preferably, the buffer layer 3 has mixed conductivity of oxygen ions (oxide ions) and electrons. The buffer layer 3 having such features as above is suitable for use in a metal-supported electrochemical element E.

Incidentally, preferably, the buffer layer 3 does not contain any catalyst metal component such as Ni or Cu, etc. For, inclusion of catalyst metal component such as Ni, Cu, etc. will make it difficult to obtain the desirable buffer layer 3.

Electrolyte Layer

The electrolyte layer 4, as shown in FIG. 1, is formed in the form of a thin film on the buffer layer 3 in such a manner as to cover the electrode layer 2 and the buffer layer 3. More particularly, the electrolyte layer 4, as shown in FIG. 1, is provided across (to stride) over the buffer layer 3 and over the metal substrate 1. With this arrangement and as the electrolyte layer 4 is joined to the metal substrate 1, the electrochemical element as a whole can obtain superior robustness.

Further, the electrolyte layer 4, as shown in FIG. 1, is provided in a region in the face on the front side of the metal substrate 1 and larger than its region where the through holes 1a are provided. Namely, the through holes 1a are formed inside a region in the metal substrate 1 where the electrolyte layer 4 is formed.

Further, in the circumference of the electrolyte layer 4, leak of gas from the electrode layer 2 and the buffer layer 3 can be suppressed. Namely, in case the metal-supported electrochemical element E is employed as a constituent of an SOFC, at the time of operation of this SOFC, gas will be fed from the back side of the metal substrate 1 through the through holes 1a to the electrode layer 2. At the portion where the electrolyte layer 4 is placed in contact with the metal substrate 1, leak of the gas can be suppressed without providing any separator component such as a gasket or the like. Incidentally, in the instant embodiment, the entire circumference of the electrode layer 2 is covered by the electrolyte layer 4. Alternatively, the electrolyte layer 4 may be provided upwardly of the electrode layer 2 and the buffer layer 3 and a gasket or the like may be provided in the circumference.

As a material forming the electrolyte layer 4, YSZ (yttria stabilized zirconia), SSZ (scandium stabilized zirconia), GDC (gadolinium-doped ceria), YDC (yttrium-doped ceria), SDC (samarium-doped ceria), etc. can be used. In particular, a zirconia-based ceramics can be used advantageously. If the electrolyte layer 4 is formed of zirconia-based ceramics, the operating temperature of SOFC using the metal-supported electrochemical element E can be made relatively higher, compared with a ceria-based ceramics. For instance, in case the metal-supported electrochemical element is used in SOFC, as a material of the electrolyte layer 4, such material, e.g. YSZ that can achieve high electrolyte performance even in a high-temperature range of 650° C. or higher approximately will be employed, and a hydrocarbon-based raw fuel such as city gas, LPG, etc. will be used as a raw fuel of the system and the raw fuel will be formed into an anode gas for the SOFC via e.g. steam reforming. With this, there can be constructed a highly efficient SOFC system using heat generated from cell stack of the SOFC for reforming the raw fuel gas.

Preferably, the electrolyte layer 4 is formed by such a technique as a low-temperature firing technique (e.g. a wet-type method using a firing process in a low-temperature range, without firing in a high-temperature range higher than 1100° C., for instance), aerosol deposition technique, thermal spraying technique, sputtering technique, pulse laser deposition technique, etc. With use of a firm formation process usable in such low-temperature range, an electrolyte layer 4 that is dense and has high gas tightness and gas barrier characteristics can be obtained without using e.g. firing in a high-temperature range higher than 1100° C. Therefore, the metal substrate 1 will not be damaged and mutual element diffusion between the metal substrate 1 and the electrode layer 2 can be suppressed, whereby an electrochemical element E having superior durability can be realized advantageously. In particular, if low-temperature sintering technique, aerosol deposition technique, thermal spraying technique or the like is used, an element at low cost can be realized advantageously. Moreover, using the aerosol deposition technique will be further preferred since such electrolyte layer 4 that is dense and has high gas tightness and gas barrier characteristics can be obtained easily.

The electrolyte layer 4 is formed dense in order to shield gas leak of anode gas or cathode gas and also to realize high ion conductivity. Preferably, the density of the electrolyte layer 4 is 96% or more, more preferably 98% or more. In case the electrolyte layer 4 is provided as a uniform layer, its density is preferably 96% or more, more preferably 98% or more. In case the electrolyte layer 4 is formed as a plurality of layers, preferably, at least one or some thereof include a layer of 98% or more density (dense electrolyte layer), more preferably a layer of 99% or more density (dense electrolyte layer). For, in the case of such dense electrolyte layer being included in a portion of the electrolyte layer 4, even when the electrolyte layer 4 is formed as a plurality of layers, an electrolyte layer 4 that is dense and has high gas tightness and gas barrier characteristics can be obtained easily.

Reaction Preventing Layer

The reaction preventing layer 5 is a layer in the form of a thin film on the electrolyte layer 4. The material of this reaction preventing layer 5 can be any material capable of preventing reaction between a component of the electrolyte layer 4 and a component of the counter electrode layer 6. For instance, a ceria-based material or the like may be employed. With the presence of the reaction preventing layer 5 between the electrolyte layer 4 and the counter electrode layer 6, reaction between a constituent component of the counter electrode layer 6 and a constituent component of the electrolyte layer 4 can be suppressed effectively, so that the long-term stability of the performance of the metal-supported electrochemical element E can be improved. Forming of the reaction preventing layer 5 can employ appropriately a technique that allows formation at a processing temperature of 1100° C. or lower. With this, damage to the metal substrate 1 can be suppressed and also mutual element diffusion between the metal substrate 1 and the electrode layer 2 can be suppressed, whereby a metal-supported electrochemical element E having superior performance and durability can be realized advantageously. For instance, it can be formed with using such technique as wet type technique (low-temperature firing technique) by painting or spraying, aerosol deposition technique, thermal spraying technique, sputtering technique, pulse laser deposition technique, etc. suitably. In particular, more preferably, with use of the low-temperature firing technique, the aerosol deposition technique, the thermal spraying technique, etc., the element can be realized at low cost. Further, using handling the low-temperature firing technique is more preferred since this facilitates handling of the raw material advantageously.

Counter Electrode Layer

The counter electrode layer 6 is a layer in the form of a thin film on/over the electrolyte layer 4 or the reaction preventing layer 5. As a material of the counter electrode layer 6, a composite oxide such as LSCF, LSM, etc. can be employed. Forming of the counter electrode layer 6 can employ appropriately a technique that allows formation at a processing temperature of 1100° C. or lower. With this, damage to the metal substrate 1 can be suppressed and also mutual element diffusion between the metal substrate 1 and the electrode layer 2 can be suppressed also, whereby a metal-supported electrochemical element E having superior performance and durability can be realized advantageously. For instance, it can be formed with using such technique as wet type technique (low-temperature firing technique) by printing or spraying, aerosol deposition technique, thermal spraying technique, sputtering technique, pulse laser deposition technique, etc. suitably. In particular, more preferably, with use of the low-temperature firing technique, the aerosol deposition technique or the thermal spraying technique, the element can be realized at low cost. Further, using handling the low-temperature firing technique is more preferred since this facilitates handling of the raw material advantageously.

Solid Oxide Fuel Cell

With the above-described arrangements of the metal-supported electrochemical element E, this metal-supported electrochemical element E can be used as power generating cell of a solid oxide fuel cell. For instance, a fuel gas containing hydrogen is fed from the back-side face of the metal substrate 1 to the electrode layer 2 through the through holes 1a and air is fed to the counter electrode layer 6 as the counter electrode for the electrode layer 2 and the fuel cell is operated at a temperature of 600° C. or higher and 750° C. or lower. With this, in the counter electrode layer 6, oxygen $O_2$ contained in the air reacts with electrons $e^-$, thus generating oxygen ions $O^{2-}$. Then, these oxygen ions $O^{2-}$ permeate the electrolyte layer 4 to move to the electrode layer 2. In this electrode layer 2, hydrogen $H_2$ contained in the fed fuel gas reacts with the oxygen ions $O^{2-}$. thus producing water $H_2O$ and electrons $e^-$. As a result of the above-described reaction, an electromotive force is generated between the electrode layer 2 and the counter electrode layer 6. In this case, the electrode layer 2 serves as the fuel electrode (anode) of the SOFC and the counter electrode layer 6 serves as the air electrode (cathode) of the same.

Method of Manufacturing Metal-Supported Electrochemical Element

Next, there will be explained a method of manufacturing the metal-supported electrochemical element E.

Electrode Layer Forming Step

At an electrode layer forming step, in the face on the front side of the metal substrate 1 and in a region thereof larger than the region where the through holes 1a are provided, the electrode layer 2 is formed as a thin film. The through holes 1a of the metal substrate 1 can be formed by e.g. a laser beam machining. Forming of the electrode layer 2, as described above, can employ such technique as low-temperature firing technique (wet type technique effecting firing in a low temperature range of 1100° C. or lower), aerosol deposition technique, thermal spraying technique, etc. suitably. With use of whichever technique, it is preferred that such technique be implemented at a temperature of 1100° C. or lower in order to suppress deterioration of the metal substrate 1.

In case the electrode layer forming step is effected by the low-temperature firing technique, this will be effected like a following example.

Firstly, material power of the electrode layer 2 and a solvent are mixed to prepare material paste and this is applied to the face on the front side of the metal substrate 1 and then fired at 800° C.-1100° C.

Diffusion Suppressing Layer Forming Step

During the firing process at the above-described electrode layer forming step, a metal oxide layer 1b (diffusion suppressing layer) is formed on the surface of the metal substrate 1. Incidentally, if the above firing process includes a firing step using an atmosphere condition with its firing atmosphere having a low oxygen partial pressure, this will be advantageous since it achieves high mutual element diffusion suppressing effect, which allows formation of a quality metal oxide layer 1b (diffusion suppressing layer) having a low resistance value. Including also the case of the electrode layer forming step not involving firing (e.g. aerosol deposition technique), a diffusion suppressing layer forming step can be provided separately. In either case, it is preferred that such technique be implemented at a temperature of 1100° C. or lower where damage to the metal substrate 1 can be suppressed.

Buffer Layer Forming Step

At a buffer layer forming step, the buffer layer 3 will be formed as a thin film on the electrode layer 2 in such a manner as to cover this electrode layer 2. Forming of the buffer layer 3, as described above, can employ such technique as low-temperature firing technique (wet type technique of effecting firing in a low-temperature range of 1100° C. or lower), aerosol deposition technique, thermal spraying technique, etc. suitably. With use of whichever technique, it is preferred that such technique be implemented at a temperature of 1100° C. or lower in order to suppress deterioration of the metal substrate 1.

In case the buffer layer forming step is effected by the low-temperature firing technique, this will be effected like a following example.

Firstly, material power of the buffer layer 3 and a solvent are mixed to prepare material paste and this is applied to the electrode layer 2 and then fired at 800° C.-1100° C.

Electrolyte Layer Forming Step

At an electrolyte layer forming step, the electrolyte layer 4 is formed as a thin film on the buffer layer 3 in such as manner as to cover the electrode layer 2 and the buffer layer 3. Forming of the electrolyte layer 4 can be effected, as described above, by such technique as the low-temperature firing technique (wet type technique of effecting firing in a low-temperature range of 1100° C. or lower), the aerosol deposition technique, the thermal spraying technique, the sputtering technique, the pulse laser deposition technique, etc. With use of whichever technique, it is preferred that such technique be implemented at a temperature of 1100° C. or lower in order to suppress deterioration of the metal substrate 1.

In order to form a quality electrolyte layer 4 that is dense and has high gas tightness and gas barrier characteristics in the temperature range of 1100° C. or lower, it is preferred that the electrolyte layer forming step be implemented by the aerosol deposition technique. In such case, material power of the electrolyte layer 4 will be prepared into aerosol by a carrier gas and this aerosol will be sprayed against the buffer layer 3 of the metal substrate 1, thus forming the electrolyte layer 4.

Reaction Preventing Layer Forming Step

At a reaction preventing layer forming step, the reaction preventing layer 5 is formed as a thin film on the electrolyte layer 4. Forming of the reaction preventing layer 5 can be effected, as described above, by such technique as the low-temperature firing technique, the aerosol deposition technique, the thermal spraying technique, the sputtering technique, the pulse laser deposition technique, etc. With use of whichever technique, it is preferred that such technique be implemented at a temperature of 1100° C. or lower in order to suppress deterioration of the metal substrate 1.

Counter Electrode Layer Forming Step

At a counter electrode layer forming step, the counter electrode layer 6 is formed as a thin film on the reaction preventing layer 5. Forming of the counter electrode layer 6 can be effected, as described above, by such technique as the low-temperature firing technique, the aerosol deposition technique, the thermal spraying technique, the sputtering technique, the pulse laser deposition technique, etc. With use of whichever technique, it is preferred that such technique be implemented at a temperature of 1100° C. or lower in order to suppress deterioration of the metal substrate 1.

In the manner described above, the metal-supported electrochemical element E can be manufactured. Incidentally, while it is possible to omit the reaction preventing layer forming step or to add a step of forming an additional layer or to laminate a plurality of same kind of layers one on another, in any case, it is preferred that the process be carried out at a temperature of 1100° C. or lower.

Second Embodiment

In the first embodiment described above, as shown in FIG. 1, both the electrode layer 2 and the electrolyte layer 4 are provided in a region in face on the front side of the metal substrate 1, which region is greater than the region where the through holes 1a are provided.

The entire region where the through holes 1a are provided is covered by the electrode layer 2 and the electrolyte layer 4.

Namely, the through holes 1a are provided inside the region of the metal substrate 1 where the electrode layer 2 is formed and inside the region where the electrolyte layer 4 is formed, at the same time. In other words, all of the through holes 1a are provided to face the electrode layer 2. An alternative arrangement can be provided as shown in FIG. 2.

Figure 2:
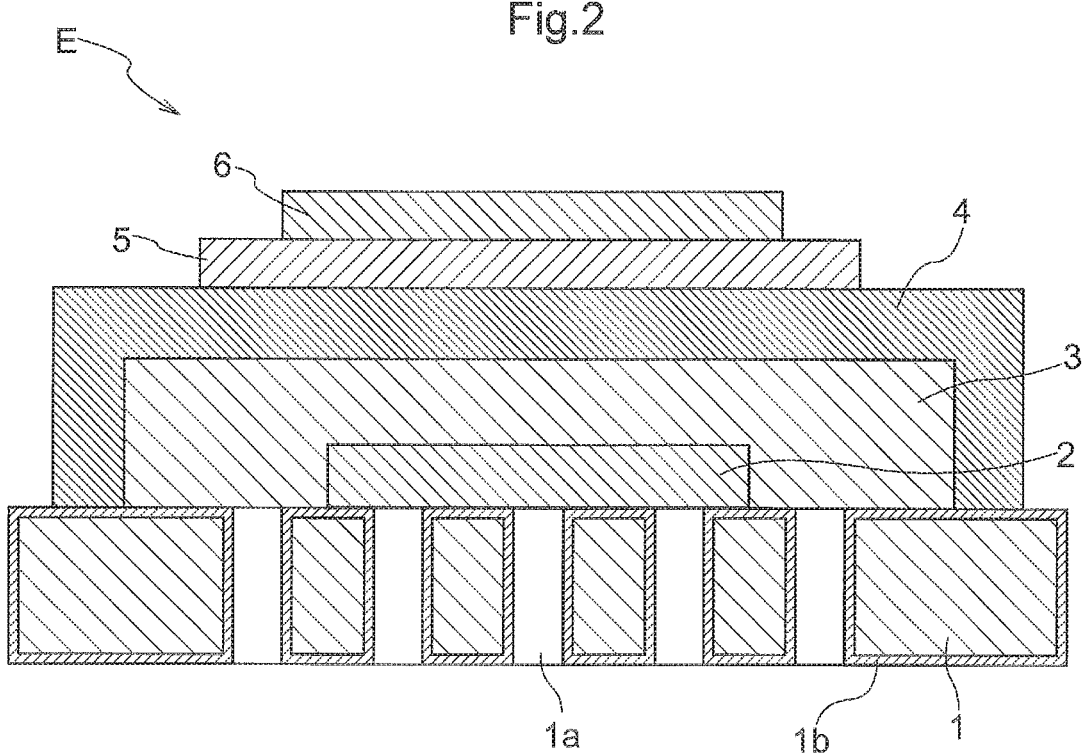
FIG. 2 is a schematic showing a configuration of a metal-supported electrochemical element.

In the arrangement shown in FIG. 2, the electrode layer 2 is provided in a region smaller than the region where the through holes 1a are provided. The buffer layer 3 and the electrolyte layer 4 are provided in a region greater than the region where the through holes 1a are provided. The entire region where the through holes 1a are provided is covered by the buffer layer 3 and the electrolyte layer 4. Namely, the through holes 1a are provided outside and inside the region where the electrode layer 2 is formed. Further, the through holes 1a are provided inside the region where the electrolyte layer 4 is formed. In other words, the through holes 1a are provided to face the electrode layer 2 and the buffer layer 3.

Third Embodiment

Figure 3:
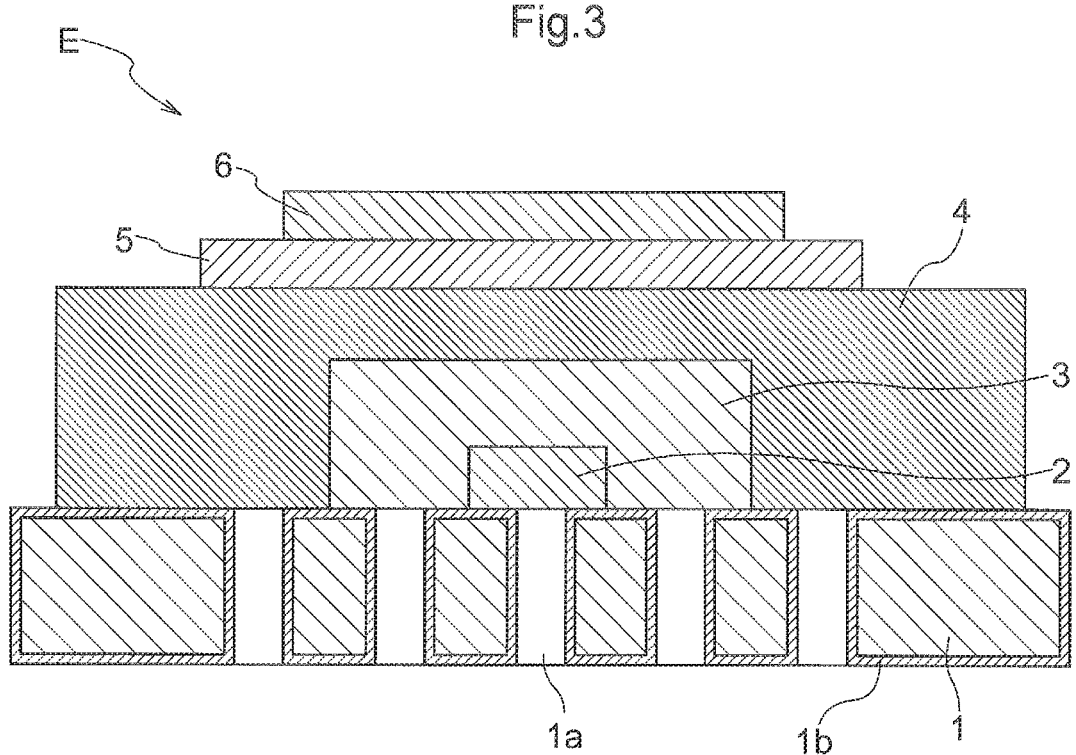
FIG. 3 is a schematic showing a configuration of a metal-supported electrochemical element.

A still further arrangement shown in FIG. 3 is also possible. In the arrangement shown in FIG. 3, In the arrangement shown in FIG. 3, the electrode layer 2 and the buffer layer 3 are provided in a region smaller than the region where the through holes 1a are provided. The electrolyte layer 4 is provided in a region greater than the region where the through holes 1a are provided. The entire region where the through holes 1a are provided is covered by the electrolyte layer 4. Namely, the through holes 1a are provided inside and outside the region where the electrode layer 2 is formed. Further, the through holes 1a are provided inside and outside the region where the buffer layer 3 is formed. Still further, the through holes 1a are provided inside the region where the electrolyte layer 4 is formed. In other words, the through holes 1a are provided to face the electrode layer 2, the buffer layer 3 and the electrolyte layer 4.

Figure 4:
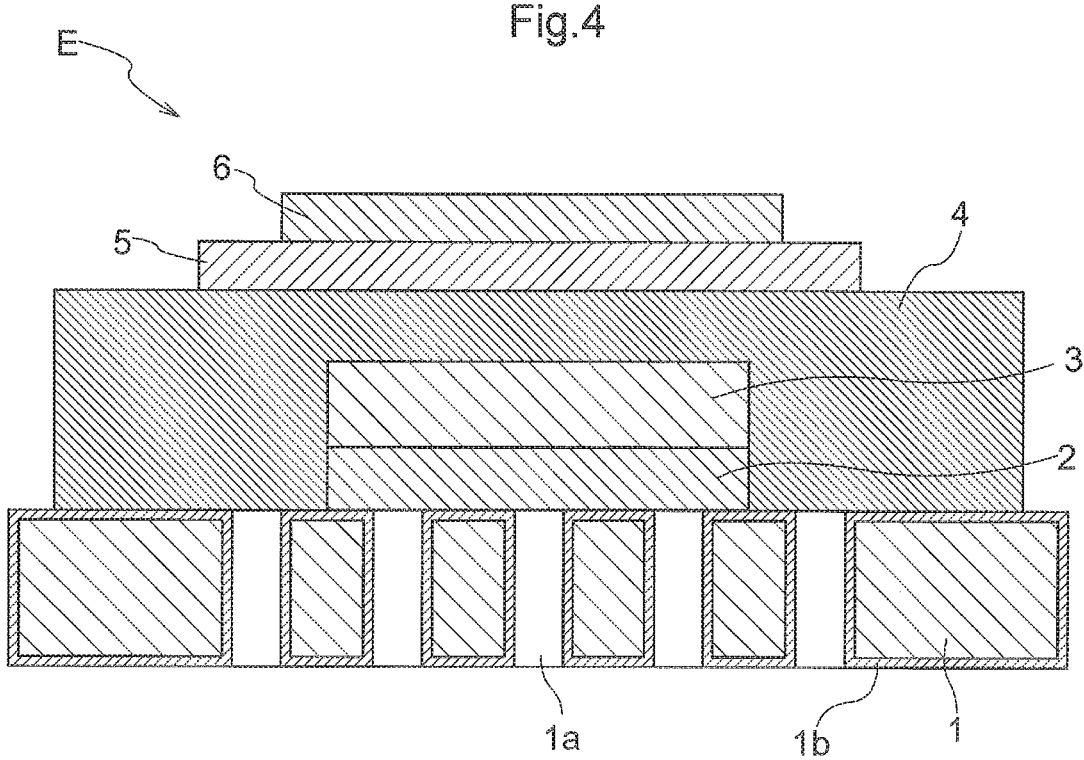
FIG. 4 is a schematic showing a configuration of a metal-supported electrochemical element.

A still further arrangement shown in FIG. 4 is also possible. In the arrangement shown in FIG. 4, the electrode layer 2 and the buffer layer 3 are provided in a region smaller than the region where the through holes 1a are provided. The buffer layer 3 is provided in the region where the electrode layer 2 is provided. The electrolyte layer 4 is provided in a region greater than the region where the through holes 1a are provided. The entire region where the through holes 1a are provided is covered by the electrolyte layer 4.

Namely, the through holes 1a are provided inside and outside the region where the electrode layer 2 is formed. Further, the through holes 1a are provided inside the region where the electrolyte layer 4 is formed. In other words, the through holes 1a are provided to face the electrode layer 2 and the electrolyte layer 4.

Fourth Embodiment

In the foregoing embodiments, the metal-supported electrochemical element E is used in a solid oxide fuel cell. Instead, the metal-supported electrochemical element E can be used in a solid oxide electrolyte cell or an oxygen sensor using a solid oxide, etc.

Fifth Embodiment

In the foregoing embodiments, as the material of the electrode layer 2, a cermet material, e.g. NiO-GDC, Ni-GDC, NiO—YSZ, Ni—YSZ, CuO—$CeO_2$, Cu—$CeO_2$, etc. is employed. And, as the material of the counter electrode layer 6, a composite oxide such as LSCF, LSM, etc. is employed. And, hydrogen gas is supplied to the electrode layer 2 to constitute a fuel electrode and air is supplied to the counter electrode layer 6 to constitute an air electrode, so that the metal-supported electrochemical element E is employed as a solid oxide fuel cell. Alternatively, the metal-supported electrochemical element E can be configured such that the electrode layer 2 constitutes an air electrode and the counter electrode layer 6 constitutes a fuel cell. Namely, as the material of the electrode layer 2, a composite oxide such as LSCF, LSM, etc. is employed; whereas, as the material of the counter electrode layer 6, a cermet material, e.g. NiO-GDC, Ni-GDC, NiO—YSZ, Ni—YSZ, CuO—$CeO_2$, Cu—$CeO_2$, etc. is employed. With the metal-supported electrochemical element E configured as above, air is supplied to the electrode layer 2 to constitute an air electrode and hydrogen gas is supplied to the counter electrode 6 to constitute a fuel electrode, so that the metal-supported electrochemical element E can be used as a solid oxide fuel cell.

Incidentally, the configuration disclosed in the foregoing embodiment can be used in combination with any configurations disclosed in the further embodiments, unless contradiction occurs as a result of such combination. Further, the embodiments disclosed in this detailed disclosure are only exemplary, and embodiments of the present invention are not limited thereto, but can be modified appropriately within a range not departing from the object of the present invention.

Next, production effected of samples of the metal-supported electrochemical element E under a variety of conditions and results of various determinations effected thereon will be explained next.

Sample 1; Example

In a circular Crofer 22APU metal plate having a thickness of 0.3 mm and a diameter of 25 mm, a plurality of through holes 1a were provided in a region having a radius of 2.5 mm from its center by a laser beam machining, thus fabricating a metal substrate 1. In this, incidentally, the through holes 1a were formed by the laser beam machining such that the diameters of the through holes 1a on the surface of the metal substrate 1 may range from 10 to 15 μm approximately.

Next, 60 wt. % of NiO powder and 40 wt. % of GDC powder were mixed, to which an organic binder and an organic solvent were added thus preparing paste. Then, with using this paste, an electrode layer 2 was laminated in a region having a radius of 3 mm from its center. Incidentally, the screen printing technique was employed in forming the electrode layer 2.

Next, to the metal substrate 1 with the electrode layer 2 laminated thereon, a firing process was effected at 850° C. (electrode layer forming step, diffusion suppressing layer forming step).

An He leak amount from the metal substrate 1 having the electrode layer 2 laminated thereon as above was determined to provide an amount exceeding 50 mL/min·$cm^2$ under a pressure of 0.2 MPa. From this, it is understood that the electrode layer 2 was formed as a porous layer having low density and low gas barrier characteristics.

Next, to fine powder of GDC, an organic binder and an organic solvent were added to prepare paste. Then, with using this paste, a buffer layer 3 was laminated by the screen printing technique in a region having a radius of 5 mm from its center in the metal substrate 1 laminated with the electrode layer 2.

Next, to the metal substrate 1 with the buffer layer 3 laminated thereon, a firing process was effected at 1050° C. (buffer layer forming step).

The thickness of the electrode layer 2 obtained by the above step was about 10 μm and the thickness of the buffer layer 3 obtained by the above step was about 8 μm, respectively. An He leak amount from the metal substrate 1 having the electrode layer 2 and the buffer layer 3 laminated as above was determined to provide an amount exceeding 13.5 mL/min·$cm^2$ under the pressure of 0.2 MPa.

Subsequently, powder of 8YSZ (yttria stabilized zirconia) having a mode diameter of 0.7 μm approximately was prepared into aerosol by dry air at a flow rate of 6 L/min. The resultant aerosol was introduced into a chamber set to a pressure of 190 Pa and sprayed onto the buffer layer 3 of the metal substrate 1 over a range of 15 mm×15 mm to cover this buffer layer 3, thus forming an electrolyte layer 4. In this, the metal substrate 1 was not heated and the spraying was effected at the room temperature (electrolyte layer forming step). In this way, a metal-supported electrochemical element E was made.

The thickness of the electrolyte layer 4 obtained by the above step was determined to be about 5 μm. Then, an He leak amount from the metal substrate 1 with the electrode layer 2, the buffer layer 3 and the electrolyte layer 4 laminated thereon as described above under the pressure of 0.2 MPa was determined to be less than the detection lower limit (1.0 mL/min·$cm^2$). Namely, in comparison with the He leak amount under the condition where the lamination was made up to the buffer layer 3, the He leak amount was significantly reduced, being below the detection limit, under the condition of the electrolyte layer 4 being laminated. Thus, it was confirmed that the formed electrolyte layer 4 had good quality with high density and gas barrier characteristics.

Next, to fine powder of GDC, an organic binder and an organic solvent were added to prepare paste. Then, with using this paste and the screen printing technique, a reaction preventing layer 5 was formed on the electrolyte layer 4 of the metal-supported electrochemical element E.

Thereafter, to the metal-supported electrochemical element E with the reaction preventing layer 5 formed thereon, a firing process was effected at 1000° C. (reaction preventing layer forming step).

Further, GDC powder and LSCF powder were mixed and then added with an organic binder and an organic solvent, thus preparing paste. Then, with using this paste and the screen printing technique, a counter electrode layer 6 was formed on the reaction preventing layer 5. Finally, the metal-supported electrochemical element E with the counter electrode layer 6 formed thereon was subjected to a firing process at 900° C. (counter electrode layer forming step), whereby a metal-supported electrochemical element E was obtained.

On the metal-supported electrochemical element E thus obtained, determination was made about its open circuit voltage (OCV) as a solid oxide fuel cell with supplying hydrogen gas to the electrode layer 2 and air to the counter electrode layer 6. The result was 1.03 V at 750° C.

Figure 5:
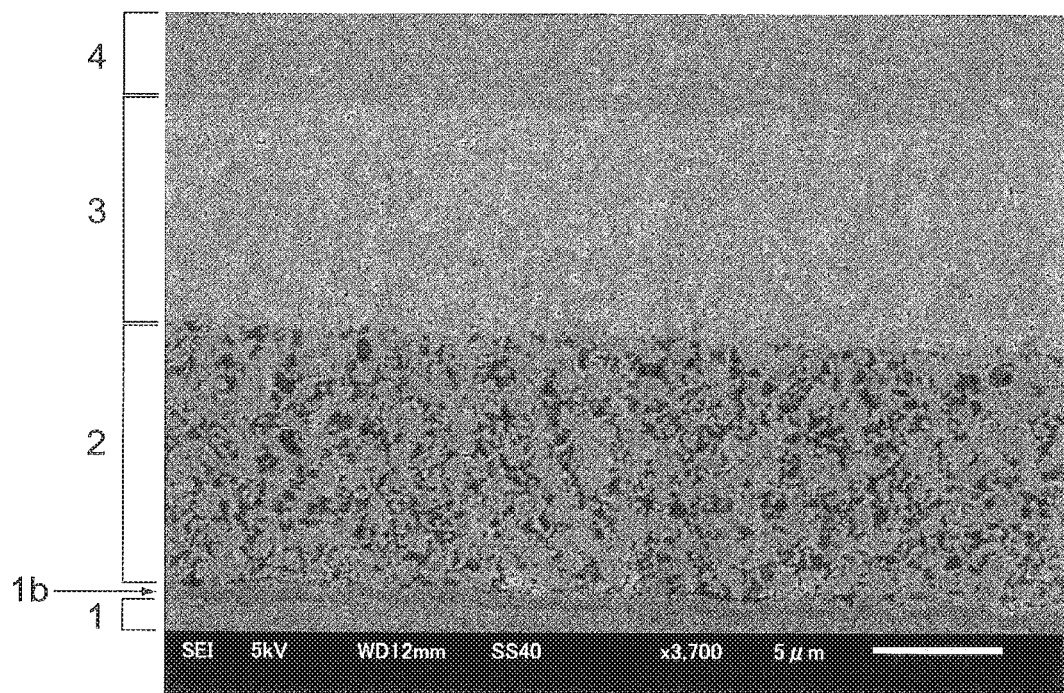
FIG. 5 shows an electron microscope photo showing a metal-supported electrochemical element in its section.

FIG. 5 shows an electron microscope photo taken along a section of the metal-supported electrochemical element E thus obtained. As shown, many black voids/pores are present in the electrode layer 2, with a relatively low density. From the image processing data shown in FIG. 5, it is assumed that the density of the electrode layer 2 is about 68%. In the electrolyte layer 4, few black voids/pores are found, thus being very dense. From the image processing data shown in FIG. 5, it is assumed that the density of the electrolyte layer 4 is about 99% or more. On the other hand, in the buffer layer 3, many black dots can be seen. So it is understood that small voids/pores are present in the buffer layer 3 and that the density of the buffer layer 3 is lower than the electrolyte layer 4 and higher than the electrode layer 2. Further, from the image processing data shown in FIG. 5, it is assumed that the density of the buffer layer 3 is about 92%. Further, the density of the buffer layer 3 obtained as above was calculated from the result of determination of an X-ray reflection ratio to provide a value of 92%. Namely, from the above results, it was confirmed that the density of the buffer layer 3 is higher than the density of the electrode layer 2 and lower than the density of the electrolyte layer 4.

Sample 2: Example

The firing temperature at the buffer layer forming step was changed now to 1000° C. Then, with the same steps as used for the Sample 1 above, a metal-supported electrochemical element E was obtained. In the sample obtained, the thickness of the electrode layer 2 was about 10 μm, the thickness of the buffer layer 3 was about 7 μm, and the thickness of the electrolyte layer 4 was about 4 μm.

An He leak amount from the metal substrate 1 when laminated up to the buffer layer 3 was 7.5 mL/min·cm$^2$ under the pressure of 0.2 MPa. Further, an He leak amount from the metal substrate 1 when laminated up to the electrolyte layer 4 was less than the detection limit of 1.0 mL/min·cm$^2$ under the pressure of 0.2 MPa. Similarly to Sample 1, in comparison with the He leak amount under the condition where the lamination was made up to the buffer layer 3, the He leak amount was significantly reduced, being below the detection limit, under the condition of the electrolyte layer 4 being laminated. Thus, it was confirmed that the formed electrolyte layer 4 had good quality with high density and gas barrier characteristics.

On the metal-supported electrochemical element E thus obtained, determination was made about its open circuit voltage (OCV) as a solid oxide fuel cell with supplying hydrogen gas to the electrode layer 2 and air to the counter electrode layer 6. The results were 1.09 V at 600° C., 1.08 V at 650° C., 1.05 V at 700° C., and 1.05 V at 750° C. Measurements were made also about currents obtained. The results were 500 mA/cm$^2$ at 0.803V at 750° C. and 750 mA/cm$^2$ at 0.700V.

Figure 6:
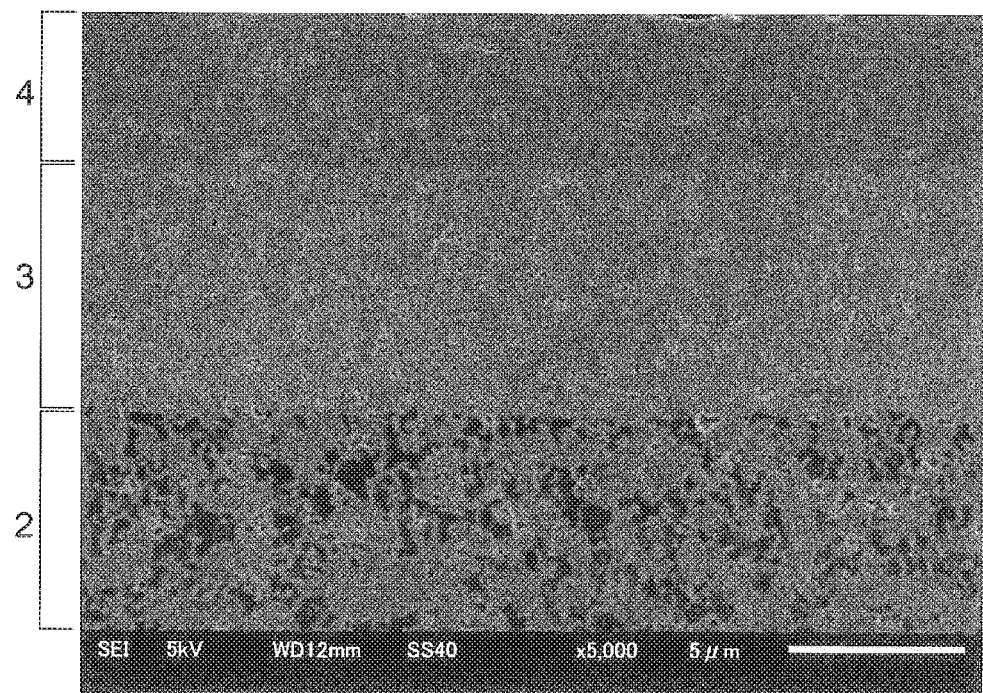
FIG. 6 shows an electron microscope photo showing a metal-supported electrochemical element in its section.

FIG. 6 shows an electron microscope photo taken along a section of the metal-supported electrochemical element E thus obtained. As shown, many black voids/pores are present in the electrode layer 2, with a relatively low density. From the image processing data shown in FIG. 6, it is assumed that the density of the electrode layer 2 is about 79%. In the electrolyte layer 4, few black voids/pores are found, thus being very dense. From the image processing data shown in FIG. 6, it is assumed that the density of the electrolyte layer 4 is about 97% or more. On the other hand, in the buffer layer 3, many black dots are found, so small voids/pores are present in the buffer layer 3, thus the density of the buffer layer 3 being slightly lower. From the image processing data shown in FIG. 6, it is assumed that the density of the buffer layer 3 is about 95%. Based on the above results, it was confirmed that the density of the buffer layer 3 is higher than the density of the electrode layer 2 and lower than the density of the electrolyte layer 4.

Sample 3: Example

The firing temperature at the buffer layer forming step was changed to 950° C. Then, with the same steps as used for the Sample 1 above, a metal-supported electrochemical element E was obtained. In the sample obtained, the thickness of the electrode layer 2 was about 13 μm, the thickness of the buffer layer 3 was about 7 μm, and the thickness of the electrolyte layer 4 was about 4 μm.

An He leak amount from the metal substrate 1 when laminated up to the buffer layer 3 was 26.5 mL/min·cm$^2$ under the pressure of 0.2 MPa. Further, an He leak amount from the metal substrate 1 when laminated up to the electrolyte layer 4 was less than 1.0 mL/min·cm$^2$ which is the detection limit under the pressure of 0.2 MPa. Similarly to Sample 1, in comparison with the He leak amount under the condition where the lamination was made up to the buffer layer 3, the He leak amount was significantly reduced, being below the detection limit, under the condition of the electrolyte layer 4 being laminated. Thus, it was confirmed that the formed electrolyte layer 4 had good quality with high density and gas barrier characteristics.

On the metal-supported electrochemical element E thus obtained, determination was made about its open circuit voltage (OCV) as a solid oxide fuel cell with supplying hydrogen gas to the electrode layer 2 and air to the counter electrode layer 6. The result was 1.02 V at 750° C.

INDUSTRIAL APPLICABILITY

The invention can be used as an electrochemical element and a solid oxide fuel cell.

DESCRIPTION OF REFERENCE MARKS/NUMERALS

1: metal substrate
1*a*: through hole
1*b*: metal oxide layer (diffusion suppressing layer)
2: electrode layer
3: buffer layer
4: electrolyte layer
5: reaction preventing layer
6: counter electrode layer
E: metal-supported electrochemical element

The invention claimed is:

1. A metal-supported electrochemical element including at least a metal substrate as a support, an electrode layer formed on/over the metal substrate, a buffer layer formed on the electrode layer, and an electrolyte layer formed on the buffer layer; wherein the electrode layer is porous, the buffer layer has a density higher than a density of the electrode layer and lower than a density of the electrolyte layer, and the buffer layer does not contain nickel.

2. The metal-supported electrochemical element of claim 1, wherein the buffer layer contains a ceria-based material.

3. The metal-supported electrochemical element of claim 1, wherein the electrolyte layer contains stabilized zirconia.

4. The metal-supported electrochemical element of claim 1, wherein the buffer layer has a thickness of 4 μm or more.

5. The metal-supported electrochemical element of claim 1, wherein the buffer layer has a thickness of 10 μm or less.

6. The metal-supported electrochemical element of claim 1, wherein the density of the buffer layer is 50% or more and less than 98%.

7. The metal-supported electrochemical element of claim 1, wherein a part of the electrolyte layer contains a dense electrolyte layer having density of 98% or higher.

8. The metal-supported electrochemical element of claim 1, wherein the element further includes a diffusion suppressing layer for suppressing diffusion of Cr from the metal substrate to the electrode layer.

9. The metal-supported electrochemical element of claim 8, wherein the diffusion suppressing layer comprises a metal oxide layer formed on a surface of the metal substrate.

10. The metal-supported electrochemical element of claim 1, wherein the metal substrate has a plurality of through holes.

11. The metal-supported electrochemical element of claim 10, wherein the through holes are formed inside a region in the metal substrate where the electrolyte layer is formed.

12. The metal-supported electrochemical element of claim 10, wherein the through holes are formed inside a region in the metal substrate where the electrode layer is formed.

13. The metal-supported electrochemical element of claim 1, wherein on/over the electrolyte layer, there is provided a counter electrode layer as a counter electrode to the electrode layer.

14. The metal-supported electrochemical element of claim 13, wherein the element further includes a reaction preventing layer formed between the electrolyte layer and the counter electrode layer.

15. The metal-supported electrochemical element of claim 1, wherein the electrode layer is made of a cermet material.

16. A solid oxide fuel cell comprising the metal-supported electrochemical element of claim 1, wherein the fuel cell can be operated at time of its rated operation in a temperature range from 600° C. or higher to 750° C. or lower.

17. A method of manufacturing the metal-supported electrochemical element of claim 1, comprising:
an electrode layer forming step for forming a porous electrode layer on/over a metal substrate as a support;
a buffer layer forming step for forming a buffer layer on the electrode layer; and
an electrolyte layer forming step for forming an electrolyte layer on the buffer layer;
wherein the buffer layer has density higher than density of the electrode layer and lower than density of the electrolyte layer; and
the electrode layer forming step, the buffer layer forming step, and the electrolyte layer forming step are effected at 1100° C. or lower.

* * * * *